United States Patent [19]

Samuel

[11] Patent Number: 5,211,003

[45] Date of Patent: May 18, 1993

[54] DIFFUSER CLEAN AIR BLEED ASSEMBLY

[75] Inventor: Billy P. Samuel, Madeira, Ohio

[73] Assignee: General Electric Company, Cincinnati, Ohio

[21] Appl. No.: 831,707

[22] Filed: Feb. 5, 1992

[51] Int. Cl.[5] ............................ F02C 6/18; F02G 3/00
[52] U.S. Cl. ................................ 60/39.02; 60/39.07; 60/751
[58] Field of Search ..................... 60/39.02, 39.07, 751

[56] References Cited

U.S. PATENT DOCUMENTS

| | | | |
|---|---|---|---|
| 3,394,543 | 6/1968 | Slattery | 60/39.07 |
| 3,777,489 | 12/1973 | Johnson et al. | 60/39.07 |
| 3,898,799 | 8/1975 | Pollert et al. | 60/226 R |
| 3,905,191 | 9/1975 | Matto | 60/39.07 |
| 4,459,802 | 7/1984 | Mowill | 60/39.02 |
| 4,463,552 | 8/1984 | Monhardt et al. | 60/226.1 |
| 4,554,789 | 11/1985 | Napoli et al. | 60/751 |
| 4,657,482 | 4/1987 | Neal | 60/39.07 |
| 4,989,403 | 2/1991 | Rodgers | 60/39.07 |
| 5,077,967 | 1/1992 | Widener et al. | 60/751 |

FOREIGN PATENT DOCUMENTS 2616890 12/1988 France .
2237068 4/1991 United Kingdom ............... 60/39.07

OTHER PUBLICATIONS

General Electric Company (GE), Four GE diffuser-Combustors Jan. 1, 1991.

Primary Examiner—Richard A. Bertsch
Assistant Examiner—Howard R. Richman
Attorney, Agent, or Firm—Jerome C. Squillaro

[57] ABSTRACT

A method and apparatus are provided for bleeding compressed air downstream from a diffuser outlet and upstream from a fuel injector in a gas turbine engine. A bleed manifold aft wall is disposed between the diffuser outlet and the fuel injectors and is configured for blocking recirculation flow of air discharged from the diffuser outlet to create a sheltered zone disposed in direct flow communication with the diffuser outlet. Bleed holes are disposed in the sheltered zone for channeling a portion of the diffuser discharge air directly therefrom as bleed air for use in an aircraft environmental system.

8 Claims, 4 Drawing Sheets

5,211,003

DIFFUSER CLEAN AIR BLEED ASSEMBLY

TECHNICAL FIELD

The present invention relates generally to gas turbine engines, and, more specifically, to a method and apparatus for bleeding clean air from a diffuser disposed between a compressor and combustion assembly therein.

BACKGROUND ART

Conventional passenger carrying aircraft typically include an environment system for supplying air conditioned and pressurized air to the passenger compartment. This passenger air is typically provided from one or more gas turbine engines which power the aircraft in flight and must be clean and free from oil or fuel vapors or both to ensure passenger comfort and safety. A conventional gas turbine engine includes a compressor which pressurizes ambient air which is then mixed with fuel and ignited for generating combustion gases for powering the aircraft in flight. Conventional bleed systems exist for bleeding a portion of the pressurized air from the compressor and channeling it to the environmental system for providing the passengers with clean air.

Adequate amounts of clean air are typically provided at engine speeds greater than idle. However, at relatively low engine speeds such as at ground idle or descent idle, the pressure of the bleed air typically bled from available compressor mid-stages becomes unacceptably low for providing adequate clean air to the aircraft. Accordingly, conventional bleed systems typically also include a bleed port located in the vicinity of the compressor diffuser and combustion assembly which has the highest compressed air pressures in the engine. Since bleeding compressed air from the engine decreases engine propulsion efficiency, conventional bleed systems are configured for bleeding air at about only those pressures required for providing the passenger clean air at the various altitudes of aircraft operation and speeds of the aircraft engine. Bleeding air solely at the diffuser downstream of the last stage of the compressor wherein the compressed air has its highest pressures is not desirable for all operating conditions of the aircraft and engine since decreased operating efficiency will result, which, therefore, results in relatively complex bleed systems in a conventional aircraft.

Furthermore, when bleeding air in the vicinity of the diffuser and combustion assembly, the possibility of fuel vapors mixing with the bleed air channeled to the passenger compartment must be addressed and reduced or eliminated for ensuring passenger safety and comfort. Since the conventional fuel injectors channeling fuel to the engine's combustor, are an assembly of components including fittings, leakage of fuel may occur at various locations thereof. A suitable bleed system should reduce or eliminate the likelihood of any fuel leakage being carried with the bleed air to the passenger compartment.

OBJECTS OF THE INVENTION

Accordingly, one object of the present invention is to provide a new and improved assembly and method for bleeding air for a gas turbine engine powering an aircraft.

Another object of the present invention is to provide a bleed assembly for bleeding diffuser discharge air from between a diffuser and combustion assembly of a gas turbine engine with reduced likelihood of containing fuel vapors therein from fuel leakage within the combustion assembly.

Another object of the present invention is to provide a relatively simple bleed air assembly for providing clean air to a passenger compartment in an aircraft.

Another object of the present invention is to provide a bleed air assembly effective for bleeding diffuser discharge air without adversely affecting operation of a combustion assembly disposed downstream thereof with or without bleed in operation.

Another object of the present invention is to provide a bleed air assembly disposed downstream of a diffuser outlet which does not obstruct discharge flow therefrom.

DISCLOSURE OF INVENTION

A method and apparatus are provided for bleeding compressed air downstream from a diffuser outlet and upstream from a fuel injector in a gas turbine engine. A bleed manifold aft wall is disposed between the diffuser outlet and the fuel injectors and is configured for blocking recirculation flow of air discharged from the diffuser outlet to create a sheltered zone disposed in direct flow communication with the diffuser outlet. Bleed holes are disposed in the sheltered zone for channeling a portion of the diffuser discharge air directly therefrom as bleed air for use in an aircraft environmental system.

BRIEF DESCRIPTION OF DRAWINGS

The novel features believed characteristic of the invention are set forth and differentiated in the claims. The invention, in accordance with preferred and exemplary embodiments, together with further objects and advantages thereof, is more particularly described in the following detailed description taken in conjunction with the accompanying drawings in which:

MODE(S) FOR CARRYING OUT THE INVENTION

Figure 1:
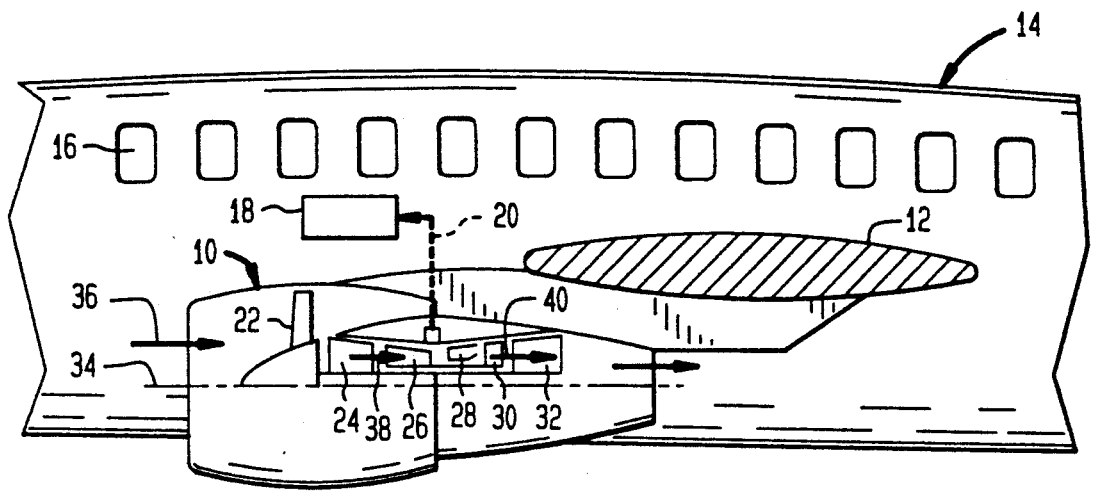
FIG. 1 is a schematic representation of a portion of an aircraft powered by a gas turbine engine having a passenger compartment bleed air assembly in accordance with one embodiment of the present invention.

Illustrated schematically in FIG. 1 is an exemplary high bypass, turbofan gas turbine engine 10 conventionally mounted to a wing 12 of a conventional passenger carrying aircraft 14 (only a portion of which is illustrated). The aircraft 14 includes a passenger compartment 16 which may be viewed through a plurality of windows in the aircraft 14. The aircraft 14 includes a conventional environmental system shown schematically at 18 which provides relatively clean and pressurized bleed air 20 into the passenger compartment 16 from the engine 10.

The exemplary engine 10 includes in serial flow communication a fan 22, a low pressure compressor 24, a high pressure compressor 26, a combustion assembly 28, a high pressure turbine 30, and a low pressure turbine 32 all being conventional and all disposed coaxially about a longitudinal centerline axis 34. The fan 22, low pressure compressor 24 and low pressure turbine 32 are conventionally joined together on a single shaft, with the low pressure turbine 32 powering the fan 22 and compressor 24. The high pressure compressor 26 and the high pressure turbine 30 are conventionally joined together on another shaft, with the high pressure turbine 30 powering the high pressure compressor 26. During operation, ambient air 36 is channeled through the fan 22 with a radially outer portion thereof being discharged from the engine for powering the aircraft 14 in flight, and with a radially inner portion thereof being channeled in turn through the compressors 24 and 26 for providing compressed air 38 to the combustion assembly 28 wherein it is conventionally mixed with fuel and ignited for generating combustion gases 40 which power the turbines 30 and 32 and are discharged from the aft end of the engine 10.

Figure 2:
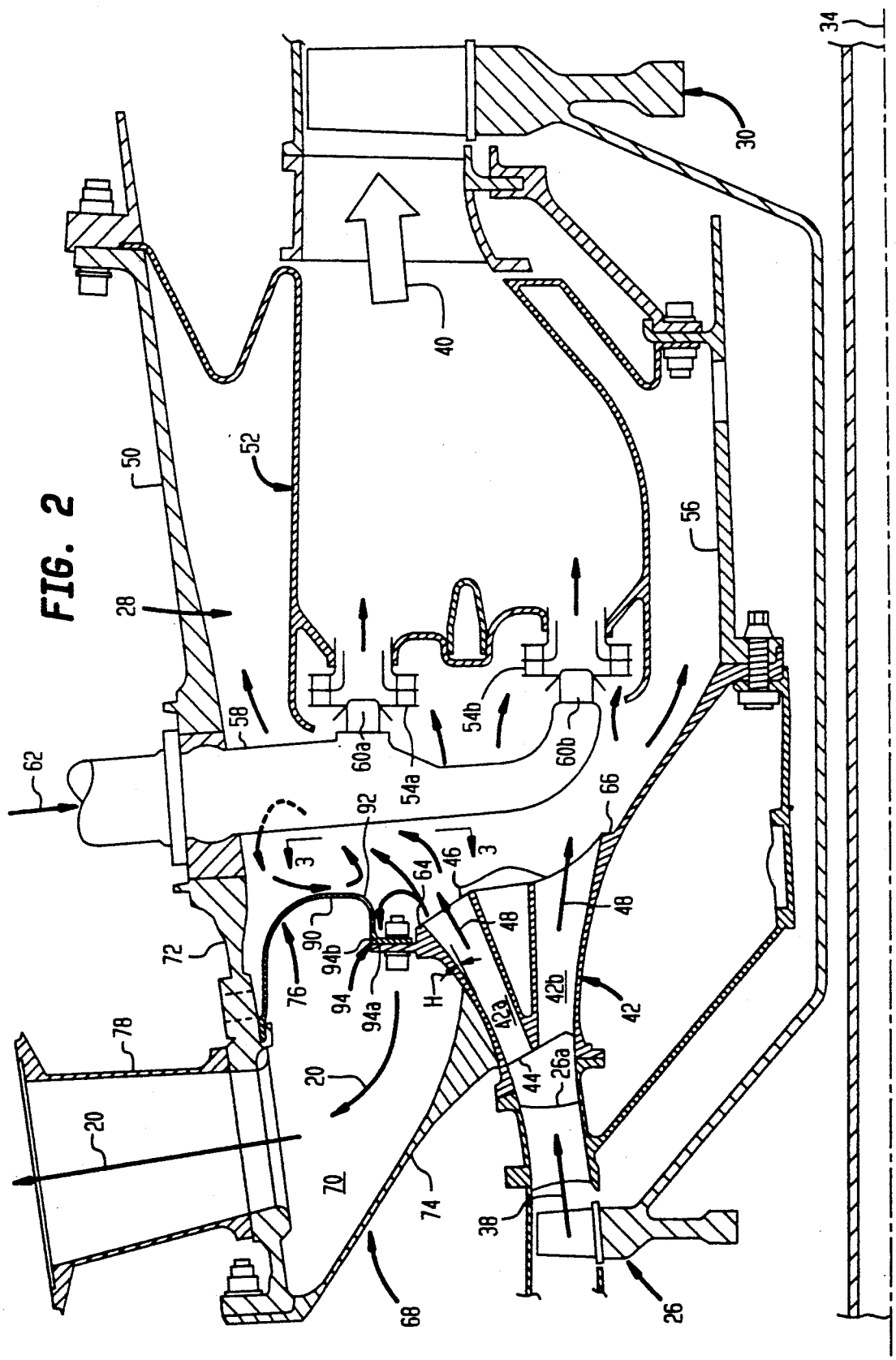
FIG. 2 is a longitudinal sectional view of a portion of the engine shown in FIG. 1 illustrating an exemplary compressor diffuser and combustion assembly utilizing the bleed air assembly in accordance with a first embodiment of the present invention, and is taken generally along line 2—2 of FIG. 3.

Illustrated in more particularity in FIG. 2 is a portion of the engine 10 between the high pressure compressor 26 and the high pressure turbine 30. Disposed downstream of the compressor 26 is a plurality of circumferentially spaced apart conventional outlet guide vanes (OGVs) 26a which receive the compressed air 38 from the compressor 26 and in turn channel it to a conventional annular diffuser 42 disposed coaxially about the centerline axis 34. In this exemplary embodiment, the diffuser 42 is a conventional radially-split diffuser having a radially outer flowpath 42a and a radially inner flowpath 42b, although a conventional single flowpath diffuser may also be used. Referring to both FIGS. 2 and 3, the diffuser 42 includes a plurality of circumferentially spaced apart conventional struts 44 through which are conventionally transmitted mechanical loads in the engine. The diffuser 42 includes at its downstream end an annular outlet 46 for discharging therefrom, i.e., from the two flowpaths 42a and 42b, the compressed air 38 diffused in the diffuser 42 as compressed diffuser discharge air 48. A conventional diffuser such as the diffuser 42 has flowpath walls such as those defining the outer and inner flowpaths 42a and 42b which conventionally diverge at respective half angles H which may be up to about 15°, and is preferably 12° in the present embodiment, for suitably diffusing the compressed air 38 for decreasing its velocity while increasing its static pressure to form the discharge air 48 discharged from the diffuser outlet 46.

The diffuser 42 is disposed in serial flow communication with the combustion assembly 28 which uses the discharge air 48 both for generating the combustion gases 40 as well as cooling the combustion assembly 28 as is conventionally known. More specifically, the combustion assembly 28 is disposed downstream from the diffuser 42 for receiving the discharge air 48 therefrom and includes an annular, radially outer casing 50 and a conventional annular combustor 52 disposed coaxially therein around the centerline axis 34. The combustor 52 is defined by conventional radially outer and inner combustion liners, and in the exemplary embodiment illustrated is a conventional double dome combustor having conventional radially outer and inner air swirlers 54a and 54b at the upstream dome end thereof. The combustor 52 at its outer liner is conventionally supported to the outer casing 50, and the combustor 52 at its inner liner is conventionally supported to an annular inner casing 56.

The combustion assembly 28 further includes a plurality of circumferentially spaced apart conventional fuel injectors 58 extending radially inwardly from the outer casing 50 and spaced downstream from the diffuser outlet 46 and upstream of the combustor 52. In this exemplary embodiment, each fuel injector 58 includes two fuel injector tips 60a and 60b which are disposed in flow communication with the respective air swirlers 54a and 54b for conventionally channeling thereto fuel 62 for forming a fuel and air mixture which is conventionally ignited and burned in the combustor 52 for generating the combustion gases 40 therein.

Referring again to FIG. 2, the diffuser 42 preferably includes an annular, downstream facing radially outer aft step 64, and an annular, downstream facing radially inner aft step 66 both extending radially away from the diffuser outlet 46 for allowing the discharge air 48 to expand downstream from and beginning at the steps 64 and 66 into the relatively larger volume defined between the outer and inner casings 50 and 56. The steps 64 and 66 define an abrupt area increase for ensuring flow stability of the discharge air 48 as is conventionally known. The aft steps 64 and 66 are preferably formed integrally with the diffuser 42, in a common casting therewith for example, and the outer aft step 64 extends radially outwardly from the diffuser outlet 46 and the outer flowpath 42a, and the inner aft step 66 extends radially inwardly from the diffuser outlet 46 and the inner flowpath 42b.

In accordance with a first embodiment of the present invention, a bleed assembly 68 is provided for channeling a portion of the discharge air 48 as the bleed air 20 to the environmental system 18 (as shown in FIG. 1) for providing relatively clean air to the passenger compartment 16. In the first embodiment, the bleed assembly 68 includes in combination with the diffuser 42 and the combustion assembly 28 an annular bleed manifold 70 disposed coaxially with the diffuser 42 around the longitudinal axis 34, and in the first embodiment illustrated in FIG. 2 is disposed radially outwardly of and surrounds the diffuser 42. The bleed manifold 70 is defined at its radially inner end by the top of the diffuser 42, and at its radially outer end by an annular manifold casing 72 extending upstream from the outer casing 50. The bleed manifold 70 also includes an annular forward wall 74 spaced upstream from an annular aft wall 76, with the aft wall 76 being spaced upstream from the fuel injectors 58 for isolating the bleed manifold 70 away from the fuel injectors 58. A plurality of conventional outlet ports 78 are conventionally joined in flow communication between the manifold 70, at the casing 72, and the environmental system 18 (see FIG. 1) for channeling the bleed air 20 thereto.

Figure 3:
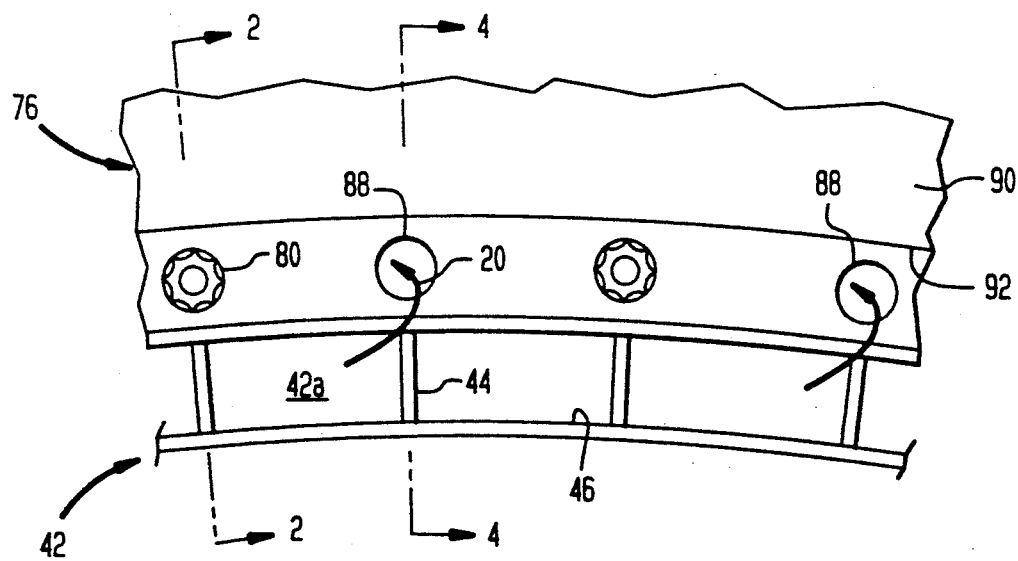
FIG. 3 is a transverse view of a portion of the diffuser and combustion assembly illustrated in FIG. 2 taken generally along line 3—3 facing in an upstream direction.

As shown in FIG. 2, the aft wall 76 extends from the manifold casing 72 radially inwardly to the diffuser 42 and is conventionally fixedly joined thereto by a plurality of circumferentially spaced apart bolts 80 (additionally shown in FIG. 3). The aft wall 76 is preferably spaced at least in part axially between the diffuser outlet 46 and the fuel injectors 58 for allowing the discharge air 48 to further expand upon entering the combustion assembly 28. It is conventionally known that when the discharge air 48 is caused to expand from the relatively low flow area diffuser 42 into the relatively high flow area region defined between the outer and inner casings 50 and 56, recirculation of a portion of the discharge air 48 will occur near the flowpath walls away from the flowpath center. Accordingly, in order to bleed a portion of the discharge air 48 for use as the bleed air 20 in the environmental system 18, it is desirable to reduce or prevent such recirculation flow from contaminating the bleed air 20 with any fuel which might leak from the fuel injectors 58 between the injector tips 60a and the outer casing 50, for example.

Figure 4:
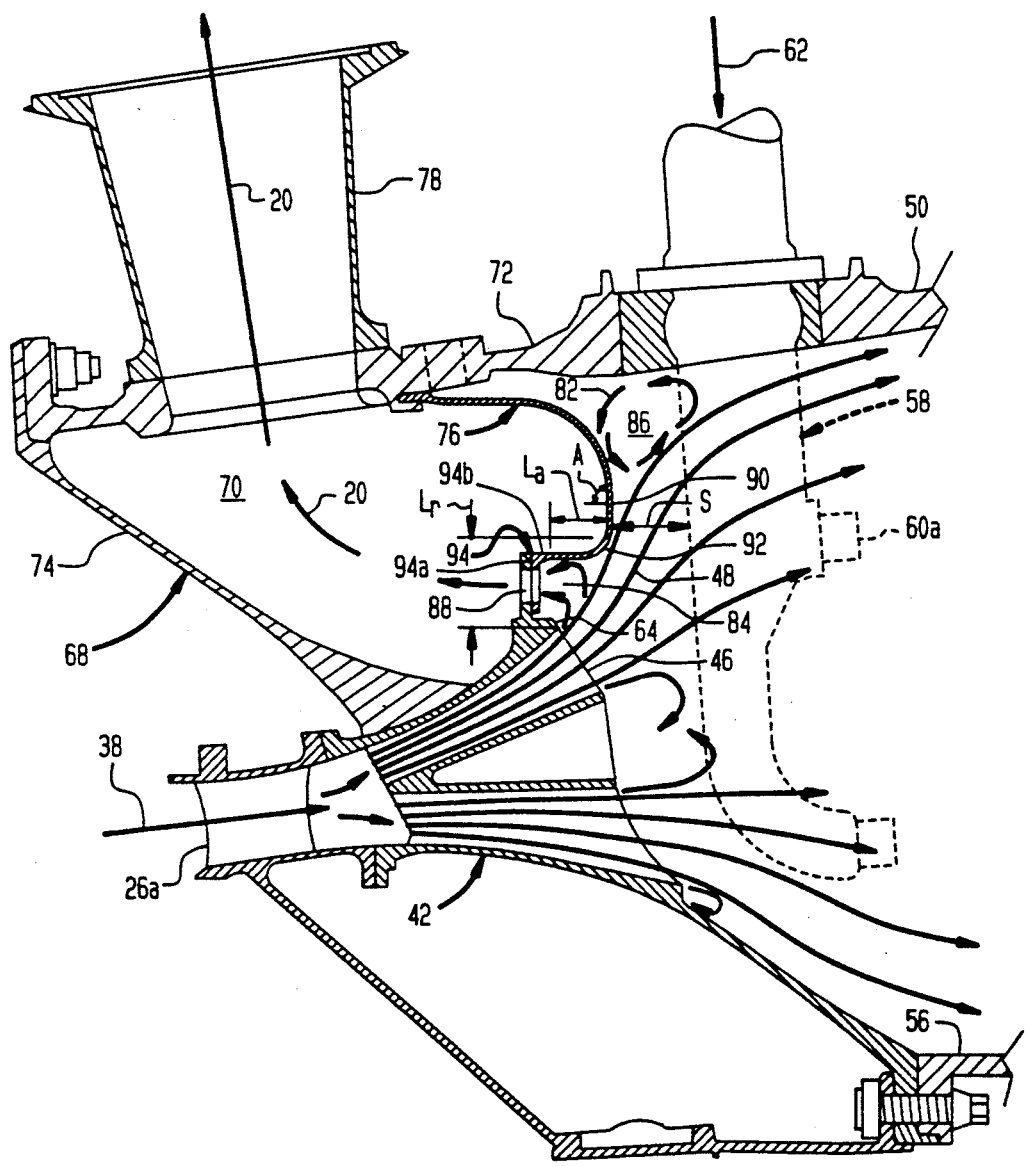
FIG. 4 is a longitudinal sectional view of a portion of the bleed air assembly in accordance with the first embodiment of the present invention taken generally along line 4—4 of FIG. 3.

The bleed assembly 68 in accordance with the first embodiment of the present invention is illustrated in more particularity in the longitudinal sectional view shown in FIG. 4 and shows the manifold aft wall 76 being predeterminedly configured for blocking recirculation flow, designated 82, of the discharge air 48 shown by representative streamlines discharged from the diffuser outlet 46 to create an annular sheltered zone 84 extending coaxially about the centerline axis 34 and disposed upstream of a recirculation zone 86 containing the recirculation flow 82. As mentioned above, the recirculation zone 86 is capable of recirculating the fuel 62 which is being channeled through the fuel injector 58 which might leak therefrom, for example between the outer casing 50 and the injector tips 60a. In accordance with one object of the present invention, the recirculation flow 82, which may become contaminated by leaked fuel 62, is blocked by the aft wall 76 from entering the bleed manifold 70. The aft wall 76 which defines with the diffuser 42 the sheltered zone 84 positions the sheltered zone 84 in direct flow communication with the diffuser outlet 46 without the aft wall 76 obstructing flow of the discharge air 48 from the diffuser outlet 46 and over the fuel injectors 58, thusly preventing undesirable flow blockage. The sheltered zone 84 is characterized by the absence of the recirculation flow 82 therein and by the absence of any fuel 62 which might be carried within the recirculation flow 82 upon leakage from the fuel injectors 58.

The manifold aft wall 76 is preferably imperforate except for a plurality of circumferentially spaced apart inlet bleed holes 88 as shown in FIG. 4 and also in FIG. 3. The bleed holes 88 are circumferentially spaced apart between adjacent ones of the bolts 80 shown in FIGS. 2 and 3. The bleed holes 88 are disposed in flow communication with the sheltered zone 84 for channeling or bleeding a portion of the discharge air 48 directly from the sheltered zone 84 as the bleed air 20.

As shown in FIG. 4, the bleed manifold aft wall 76 in accordance with the first embodiment of the bleed assembly 68 preferably includes an imperforate first portion 90 which is disposed coaxially about the centerline axis 34 and is spaced upstream from the fuel injectors 58 at a predetermined axial spacing S for defining between the first portion 90 and the fuel injectors 58 adjacent the outer casing 50 the recirculation zone 86. The first portion 90 preferably initially extends radially outwardly at an angle A relative to the centerline axis 34, which angle A may be about 90° for example. The particular angle A and the particular configuration of the first portion 90 including where it joins the casing 72 is determined for each particular design to separate the recirculation zone 86 from the sheltered zone 84.

The aft wall 76 further includes a crest 92 which is preferably integral with the first portion 90 at an upstream end thereof and also extends coaxially about the longitudinal axis 34. The crest 92 is predeterminedly spaced downstream from the diffuser outlet 46 at the outer aft step 64 at an axial distance $L_a$ for defining between the step 64 and the crest 92 the sheltered zone 84. In this exemplary embodiment, the crest 92 is also spaced radially above the diffuser outlet 46 at the step 64 at a predetermined radial distance $L_r$. The aft step 64 is preferably disposed at an upstream end of the sheltered zone 84, with the bleed holes 88 being disposed radially outwardly of the step 64. The crest 92 is therefore preferably aligned with the diffuser outlet 46 at the aft step 64 generally along a common streamline of the discharge air 48 for capturing from the discharge air 48 discharged from the diffuser outlet 46 the bleed air 20 channeled through the sheltered zone 84 to the bleed holes 88 and in turn into the manifold 70. The crest 92 and the first portion 90 extending therefrom are effective for blocking the recirculation flow 82 from entering the sheltered zone 84.

In the first embodiment of the invention illustrated in FIG. 4, the bleed manifold 70 and its aft wall 76 are preferably disposed radially outwardly of the diffuser outlet 46, and the aft wall 76 further includes a second portion 94 extending upstream from the crest 92 to the diffuser outlet 46 at the aft step 64 to define the sheltered zone 84 having a generally L-shaped section, as shown for this longitudinal plane, which faces radially inwardly. The second portion 94 includes a foot 94a preferably extending radially outwardly from the diffuser 42 adjacent the aft step 64 which includes therein the bleed holes 88. The second portion 94 also includes an imperforate leg 94b extending axially downstream from the foot 94a to the crest 92. The aft wall 76 including the first and second portions 90 and 94 is preferably a unitary, integral number.

The particular configuration of the aft wall 76 including the location of the crest 92 and the dimension S, $L_a$, $L_r$, and the angle A may be conventionally determined for each particular design application either by trial and error or by using conventional fluid mechanics numerical computational techniques for determining the streamlines of the discharge air 48 to establish the recirculation zone 86 downstream from the crest 92 with the sheltered zone 84 upstream of the crest 92. The crest 92 is preferably so positioned for allowing expansion of the discharge air 48 discharged from the diffuser outlet 46 with the outer boundaries thereof being bled into the sheltered zone 84 for channeling through the manifold 70 and to the environmental system 18. If the crest 92 does not extend sufficiently into the flow of the discharge air 48, the recirculation flow 82 will enter the bleed holes 88, and if the crest 92 extends excessively into the flow of the discharge air 48, aerodynamic performance of the discharge air 48 will be adversely affected. Accordingly, it is preferred to extend the crest 92 into the flow of the discharge air 48 only so much as is required for creating the sheltered zone 84 which is as small as possible for providing the required flowrate of bleed air 20 to the environmental system 18 without receiving any of the recirculation air 82.

Furthermore, the bleed assembly 68 including the sheltered zone 84 is effective for providing relatively clean air to the environmental system 18 without contamination by leakage of the fuel 62. The fuel injectors 58 are entirely disposed downstream from the bleed manifold 70 and therefore eliminate the possibility of direct leakage of the fuel 62 therein, with leakage of the fuel 62 into the recirculation zone 86 being prevented from reaching the sheltered zone 84 by the imperforate aft wall 76 and the crest 92. The bleed assembly 68 is relatively simple in construction and will not appreciably interfere with operation of the combustion assembly 28 when the bleed air 20 is being channeled through the manifold 70 or when the bleed assembly 68 is turned off by a conventional valve in the environmental system 18. But for the conventional valve in the environmental system 18 downstream of the outlet port 78, the bleed assembly 68 does not require any valves or other flow controlling flaps for the bleed holes 88 and operates automatically. During bleed operation, a portion of the discharge air 48 is automatically bled through the sheltered zone 84 and the bleed holes 88 into the manifold 70 and is conventionally channeled to the environmental system 18. When flow from the outlet port 78 is turned off by the environmental system 18, the discharge air 48 does not continue to flow through the bleed holes 88 but merely passes over the sheltered zone 84 and over the crest 92 without significant aerodynamic performance losses.

The first embodiment of the bleed assembly 68 illustrated in FIGS. 1-4 is effective for practicing the method of bleeding the compressed diffuser discharge air 48 from the diffuser outlet 46 in accordance with the present invention. The method includes the steps of blocking the recirculation flow 82 of the diffuser discharge air 48 to create the sheltered zone 84 without obstructing flow of the discharge air 48 over the fuel injectors 58. The method also includes the step of channeling a portion of the discharge air 48 directly from the sheltered zone 84 as the bleed air 20 into the bleed manifold 70. In the embodiment illustrated for example in FIG. 4, the blocking step blocks the recirculation flow 82 radially outwardly of the diffuser outlet 46.

Figure 5:
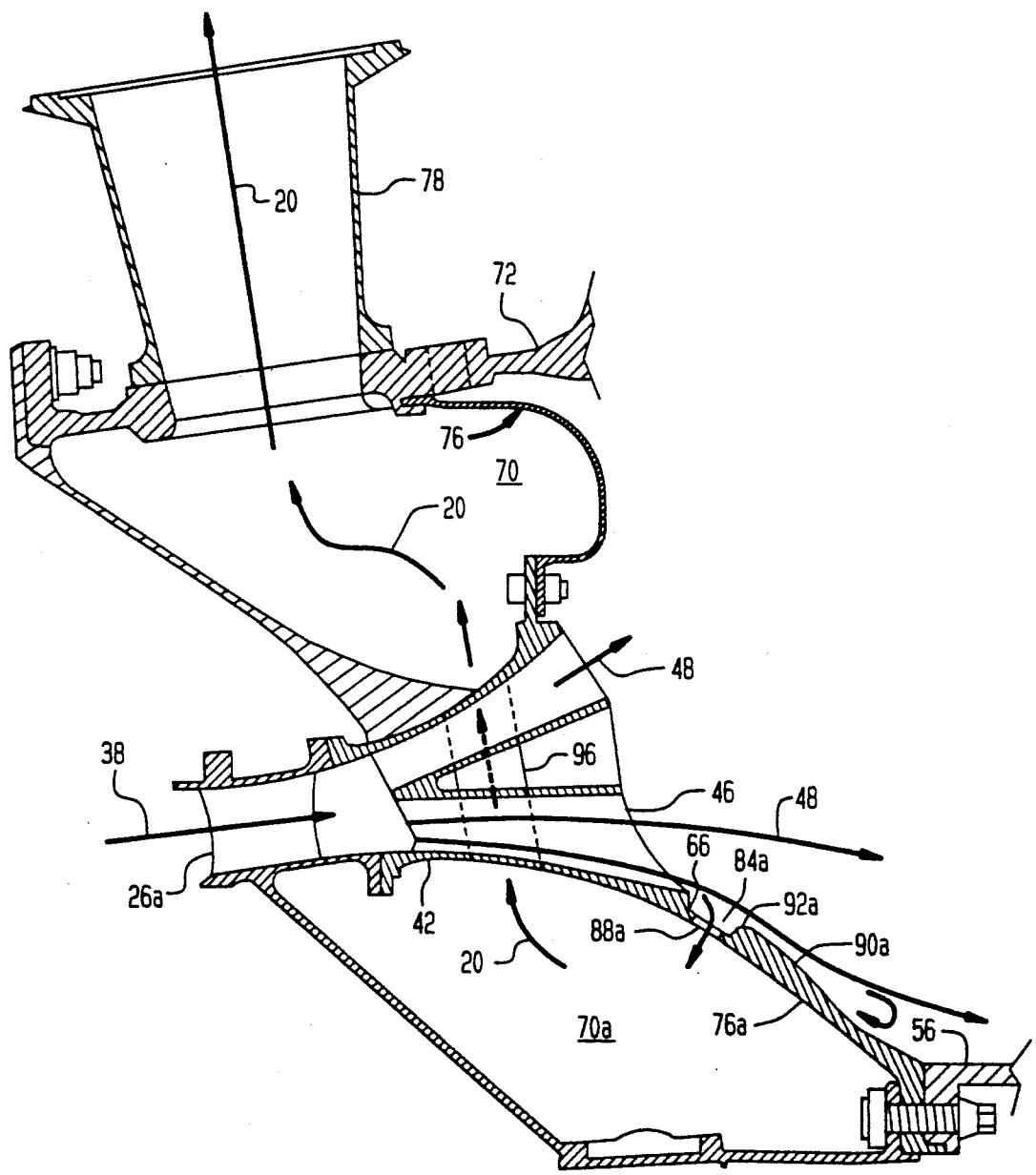
FIG. 5 is a longitudinal sectional view of a portion of a bleed air assembly in accordance with a second embodiment of the present invention.

In a second embodiment of the present invention as illustrated in FIG. 5, the blocking step blocks the recirculation flow 82 radially inwardly of the diffuser outlet 46. More specifically, in the second embodiment illustrated in FIG. 5, the bleed manifold is disposed radially inwardly of the diffuser 42 and is designated 70a. All other analogous components are also designated with a lowercase (a) suffix including the aft wall 76a including the first portion 90a and crest 92a defining a sheltered zone 84a disposed in flow communication with the bleed holes 88a. Since in this embodiment of the invention, the bleed air 20 is being bled from the diffuser outlet 46 adjacent the radially inner aft step 66, at least one conduit 96 preferably extends radially through the diffuser 42 in flow communication with the bleed holes 88a for channeling the bleed air 20 from the bleed manifold 70a and radially outwardly past and preferably through the diffuser 42 to the outlet port 78. Note that in this second embodiment of the invention, the first bleed manifold 70 may remain, except however, with the aft wall 76 being completely imperforate without bleeding the discharge air 48 directly into the bleed manifold 70 as in the first embodiment disclosed above.

In both embodiments disclosed above, conventional bleed ports disposed immediately upstream of the diffuser 42 adjacent the outlet guide vanes 26a may be eliminated, which bleed ports reduce compressor performance when bleeding operation is turned off. Such performance is reduced because the bleed holes interrupt the smooth transition of the compressed air being channeled past the OGVs 26a and into the diffuser 42. Similarly, it is not desirable to include bleed holes directly within the diffuser 42 since aerodynamic performance will be degraded. However, and in accordance with the invention as described above, by placing the bleed holes 88, 88a downstream of the diffuser outlet 46, the diffuser 42 may operate as intended for recovering static pressure from velocity without performance degradation. And, by configuring the manifold aft wall 76 as described above to include a predeterminably positioned crest 92 for defining the sheltered zone 84, the discharge air 48 may conventionally expand upon exiting the diffuser outlet 46 without obstruction or performance degradation from the aft wall 76 and bleed holes 88. By suitably positioning the crest 92 as described above for providing a boundary to the discharge air 48 for maintaining continuity of the flow streamlines without the recirculation flow 82 reaching the sheltered zone 84, bleeding of clean bleed air 20 may be obtained without flow obstruction or performance degradation.

Furthermore, the sheltered zone 84 positioned at the diffuser outlet 46 as above described causes the bleed air 20 portion of the discharge air 48 which initially flows in a generally aft, downstream direction to turn sharply toward the forward, upstream direction, e.g., between 90° and 180°, which effectively separates by centrifugal force from the bleed air 20 dust particles which may be entrained therein for providing dust-free or reduced air to the environmental system 18 in addition to fuel-free air.

While there have been described herein what are considered to be preferred embodiments of the present invention, other modifications of the invention shall be apparent to those skilled in the art from the teachings herein, and it is, therefore desired to be secured in the appended claims all such modifications as fall within the true spirit and scope of the invention.

Accordingly, what is desired to be secured by Letters Patent of the United States is the invention as defined and differentiated in the following claims:

1. A method of bleeding compressed air downstream from a diffuser outlet and upstream from a fuel injector in a gas turbine engine comprising the steps of:
   blocking recirculation flow of compressed diffuser discharge air discharged from said diffuser outlet and recirculating from adjacent said fuel injector by interposing a wall having a crest between said diffuser outlet and said fuel injector to create a sheltered zone disposed upstream of a recirculation zone containing said recirculation flow and in direct flow communication with said diffuser outlet without obstructing flow of said diffuser discharge air over said fuel injector, said sheltered zone being characterized by the absence of said recirculation flow and any fuel contained therein which may leak from said fuel injector; and
   channeling a portion of said diffuser discharge air directly from said sheltered zone as bleed air.

2. A method according to claim 1 wherein said blocking step blocks said recirculation flow radially outwardly of said diffuser outlet.

3. A method according to claim 1 wherein said blocking step blocks said recirculation flow radially inwardly of said diffuser outlet; and further including the step of channeling said bleed air from said sheltered zone radially outwardly past said diffuser.

4. A bleed assembly for a gas turbine engine comprising:

an annular diffuser having an outlet for discharging compressed diffuser discharge air, and including an annular, downstream facing aft step extending radially away from said diffuser outlet for allowing said diffuser discharge air to expand downstream from said step, said step being disposed at an upstream end of a sheltered zone;

a combustion assembly disposed downstream of said diffuser for receiving said diffuser discharge air, said assembly including:

an annular outer casing; and a plurality of circumferentially spaced apart fuel injectors extending radially inwardly from said outer casing and spaced downstream from said diffuser outlet;

an annular bleed manifold disposed coaxially with said diffuser and having a manifold aft wall, said aft wall being spaced at least in part between said diffuser outlet and said fuel injectors and configured for blocking recirculation flow of said diffuser discharge air discharged from said diffuser outlet and recirculating from adjacent said fuel injectors to create the sheltered zone disposed upstream of a recirculation zone containing said recirculation flow and in direct flow communication with said diffuser outlet without obstructing flow of said diffuser discharge air over said fuel injectors, said sheltered zone being characterized by the absence of said recirculation flow and any fuel contained therein which may leak from said fuel injectors; and said manifold aft wall comprising:

a plurality of circumferentially spaced apart bleed holes disposed in flow communication with said sheltered zone for channeling a portion of said diffuser discharge air directly from said sheltered zone as bleed air;

an imperforate first portion spaced upstream from said fuel injectors for defining therebetween said recirculation zone; and a crest at an upstream end of said first portion spaced downstream from said diffuser outlet for defining therebetween said sheltered zone, said crest being aligned with said diffuser outlet at said step for capturing from said diffuser discharge air discharged from said diffuser outlet said bleed air channeled through said sheltered zone to said bleed holes, and for blocking said recirculation flow from entering said sheltered zone.

5. A bleed assembly according to claim 4 wherein said crest is spaced upstream from said fuel injectors for providing unobstructed flow of said diffuser discharge air therebetween.

6. A bleed assembly according to claim 5 wherein said bleed manifold aft wall is disposed radially outwardly of said diffuser outlet, and further includes a second portion extending upstream from said crest to said diffuser outlet at said step to define said sheltered zone having a generally L-shaped section.

7. A bleed assembly according to claim 6 wherein said bleed manifold aft wall second portion includes:

a foot extending radially outwardly from said diffuser adjacent to said step and including said bleed holes;

a leg extending axially downstream from said foot to said crest; and said L-shaped sheltered zone faces radially inwardly in direct flow communication with said diffuser outlet.

8. A bleed assembly according to claim 5 wherein said bleed manifold aft wall is disposed radially inwardly of said diffuser outlet; and further including at least one conduit extending radially through said diffuser in flow communication with said bleed holes for channeling said bleed air from said bleed manifold radially outwardly past said diffuser.

* * * * *